(12) United States Patent
Damodaran et al.

(10) Patent No.: US 11,461,679 B2
(45) Date of Patent: Oct. 4, 2022

(54) MESSAGE MANAGEMENT USING MACHINE LEARNING TECHNIQUES

(71) Applicant: EMC IP Holding Company LLC, Hopkinton, MA (US)

(72) Inventors: Sivaraman Damodaran, Bengaluru (IN); Mahesh Reddy Nagaiah Reddy, Bangalore (IN); Vijayasri Chikmagalur Shivakumar, Bangalore (IN); Narendra Buwade, Bangalore (IN); Bijan K. Mohanty, Austin, TX (US); Hung T. Dinh, Austin, TX (US); Navin Kumar Neithalath, Bangalore (IN); Girish VenkateshaMurthy, Bengaluru (IN); Rohit Das, New Delhi (IN); Sristirupa Tripathy, Bhubaneswar (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 428 days.

(21) Appl. No.: 16/832,052

(22) Filed: Mar. 27, 2020

(65) Prior Publication Data

US 2021/0304027 A1    Sep. 30, 2021

(51) Int. Cl.
*G06N 5/04*  (2006.01)
*G06N 20/00* (2019.01)

(52) U.S. Cl.
CPC .............. *G06N 5/04* (2013.01); *G06N 20/00* (2019.01)

(58) Field of Classification Search
CPC ...................................................... G06N 5/04
See application file for complete search history.

(56) References Cited

U.S. PATENT DOCUMENTS

| | | |
|---|---|---|
| 7,153,139 B2 | 12/2006 | Wen et al. |
| 9,832,216 B2 | 11/2017 | Kaloroumakis et al. |
| 10,587,627 B1 | 3/2020 | Vallur |
| 2005/0015519 A1 | 1/2005 | Hodjat et al. |
| 2015/0310020 A1* | 10/2015 | Brav ................ G06F 40/30 707/730 |
| 2021/0271681 A1* | 9/2021 | Jayaram ............. G06Q 20/027 |

* cited by examiner

*Primary Examiner* — Brian Whipple
(74) *Attorney, Agent, or Firm* — Ryan, Mason & Lewis, LLP

(57) ABSTRACT

Methods, apparatus, and processor-readable storage media for implementing a message management framework using machine learning techniques are provided herein. An example computer-implemented method includes processing a message comprising identifying at least one message type of the message; determining, based at least in part on the at least one identified message type, one or more message failures by applying one or more machine learning-based rules to at least a portion of the message; determining one or more remedial actions by processing, using one or more machine learning techniques, the at least one identified message type, the one or more determined message failures, and multiple attributes of the message; and performing one or more automated actions based at least in part on the one or more determined remedial actions.

20 Claims, 8 Drawing Sheets

MESSAGE MANAGEMENT USING MACHINE LEARNING TECHNIQUES

FIELD

The field relates generally to information processing systems, and more particularly to communication in such systems.

BACKGROUND

Business, organizations, and other enterprises routinely need to communicate with partner enterprises with respect to transactions, agreements, etc. However, such communications can often be disrupted with invalid and/or inaccurate data, and hindrances and/or delays associated with such communications can negatively impact enterprises in terms of revenue generation, customer satisfaction, etc. Further, conventional enterprise communication approaches lack predictive capabilities to preempt invalid and/or inaccurate data in such messages.

SUMMARY

Illustrative embodiments of the disclosure provide a message management framework using machine learning techniques. An exemplary computer-implemented method includes processing a message prior to submission of the message from a first enterprise entity to a second enterprise entity, wherein processing the message comprises identifying at least one message type of the message. The method also includes determining, based at least in part on the at least one identified message type, one or more message failures by applying one or more machine learning-based rules to at least a portion of the message. Additionally, the method further includes determining one or more remedial actions by processing, using one or more machine learning techniques, the at least one identified message type, the one or more determined message failures, and multiple attributes of the message, and performing one or more automated actions based at least in part on the one or more determined remedial actions.

Illustrative embodiments can provide significant advantages relative to conventional enterprise communication approaches. For example, problems associated with an inability to preempt invalid and/or inaccurate data in enterprise messages are addressed in one or more embodiments through automatically identifying message failures and determining corresponding remedial actions using machine learning techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
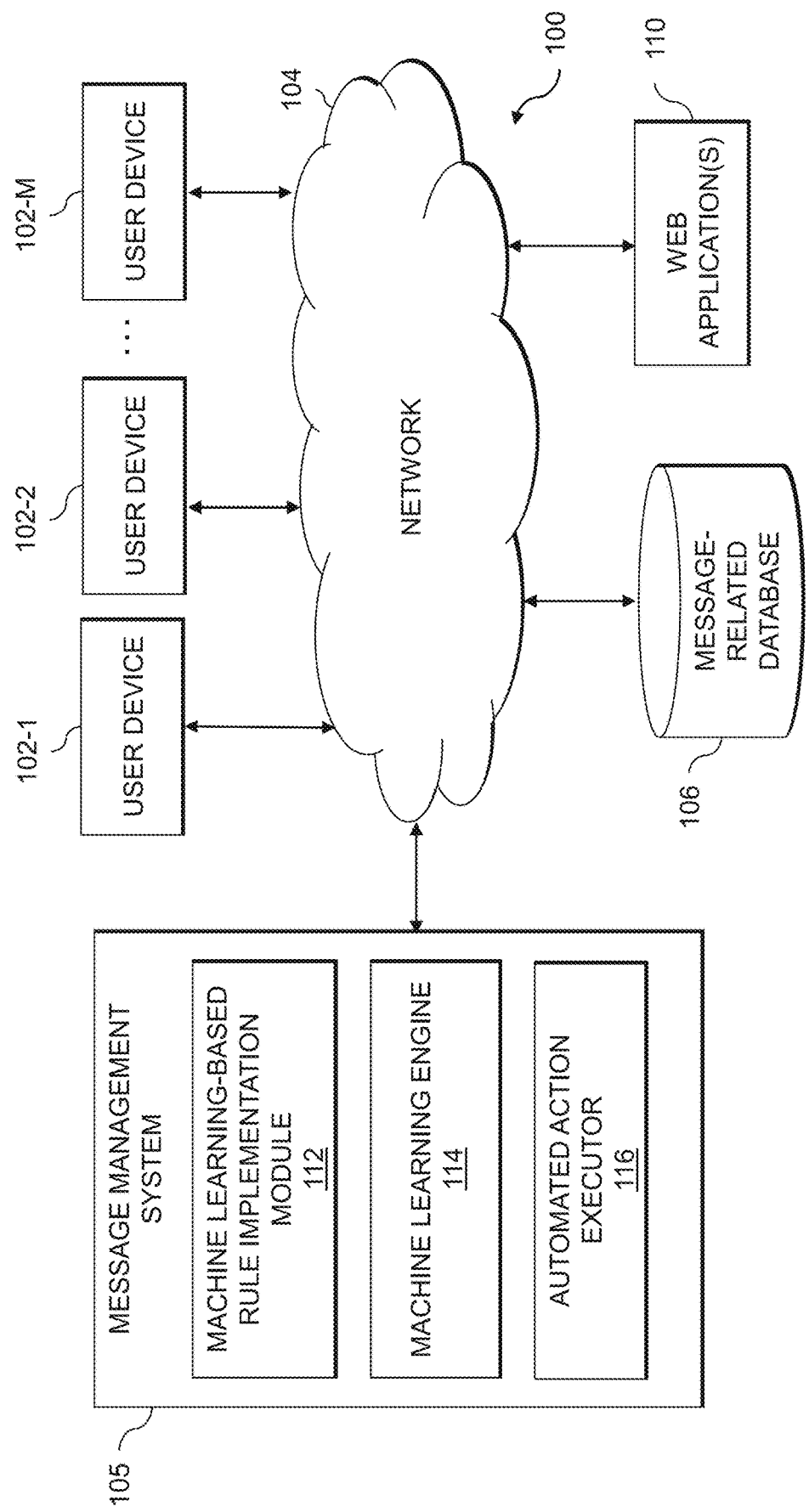
FIG. 1 shows an information processing system configured for implementing a message management framework using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is message management system 105 and web application(s) 110. As further detailed herein, in one or more embodiments, such web applications 110 can include one or more chatbots (for use, for example, in connection with information technology (IT) administrator interfaces), predictive remediation applications (used, for example, in connection with learning-based rule suggestion), templating applications (used, for example, in connection with rule reusing), API marketplace applications, data compliance applications, etc.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, message management system 105 can have an associated database 106 configured to store message-related data, which comprise, for example, rules, user information (e.g., user roles), metadata (e.g., process metadata, flow metadata, rules metadata), transaction information, schema files, payload information, historical message information, message attribute data, etc. In an example embodiment, database 106 can be used in conjunction with at least one file store to reduce latency. In such an embodiment, one or more of the services detailed herein can be partitioned into independent services (for example, to accommodate one or more scaling needs).

The database 106 in at least one embodiment is implemented using one or more storage systems associated with message management system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with message management system 105 can be input-output devices, which illustratively comprise keyboards, displays or other types of input-output devices in any combination. Such input-output devices can be used, for example, to support one or more user interfaces to message management system 105, as well as to support communication between message management system 105 and other related systems and devices not explicitly shown.

Also, the message management system 105 in the FIG. 1 embodiment is assumed to be implemented using at least one processing device. Each such processing device generally comprises at least one processor and an associated memory, and implements one or more functional modules for controlling certain features of the message management system 105.

More particularly, message management system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the message management system 105 to communicate over the network 104 with the user devices 102, and illustratively comprises one or more conventional transceivers.

The message management system 105 further comprises a machine learning-based rule implementation module 112, machine learning engine 114, and an automated action executor 116. As further detailed herein, in one or more example embodiments, machine learning-based rule implementation module 112 can include sub-modules with capabilities such as rule composition, process handling, file format handling, rule checking, notification generation, log generation, etc. Additionally or alternatively, in at least one example embodiment, automated action executor 116 can include sub-modules with capabilities such as enterprise delegation, rule API checking, message-oriented middleware listening, file listening, etc.

It is to be appreciated that this particular arrangement of modules 112, 114 and 116 illustrated in the message management system 105 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of the modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for implementing a message management framework involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example message management system 105 in computer network 100 will be described in more detail with reference to the flow diagram of FIG. 6.

Accordingly, at least one embodiment includes identifying one or more patterns related to enterprise communication failures and, based at least in part on the identified pattern(s), modifying a message before sending the modified message to an enterprise partner. Such an embodiment can include implementing an artificial intelligence (AI) business-to-business (B2B) message management framework utilizing machine learning neural networks and deep reinforcement learning. The framework processes a message and intelligently identifies the message type, applies one or more user-defined validation rules, predicts any message and/or communication failures, and automatically performs one or more proactive self-healing actions in connection with the message. In one or more embodiments, such predictive remediation of messages can be carried out via one or more deep learning techniques and/or implementation of chatbots utilizing natural language processing (NLP)

techniques. By way of example, in such an embodiment, users need not login to a portal for performing certain types of actions such as approvals, checking the status of a transaction, etc. Instead, such a user could perform one or more of those actions directly from the user's preferred enterprise chat tool(s). An AI-backed NLP engine in such a tool can continuously learn from previously-performed actions and transactions to provide the user with appropriate inputs needed to perform one or more intended actions. For instance, if there is a transaction flagged as containing an error, and the user is attempting to make a request related to the transaction, a chatbot can provide the possible reasons for the error(s) and probable solutions that the chatbot has learned from similar previous errors. In one or more embodiments, such a feature can function similarly irrespective of the point of action (e.g., chatbot or portal).

As detailed herein, at least one embodiment includes analyzing a given enterprise message, identifying the message type (e.g., order confirmation, invoice, purchase order, warranty claim, etc.), applying one or more user-defined validation rules (e.g., the identifier is in a valid list of identifiers, the creation date is in the past, the correct email recipient is identified based on the order type, all of the mandatory values are available, etc.), predicting one or more message and/or communication failures, and automatically performing at least one proactive self-healing action in connection with the message. Such self-healing actions can be based, for example, at least in part on mapped actions originating from a reinforcement learning policy. For example, one or more embodiments include generating machine learning-based suggestions for self-healing actions based on learning from past transactions and previous fixes and/or remedial actions taken in connection with the failure scenarios. Additionally, in at least one embodiment, machine learning techniques are also utilized to recommend which type(s) of data formats are needed in connection with the self-healing action(s), and such an embodiment further includes augmenting the relevant portion(s) of the data accordingly.

Also, at least one embodiment includes generating and/or implementing one or more smart API libraries. For example, in one such embodiment, a smart API library includes multiple different types of APIs, which can be part of an enterprise information system (EIS). The APIs implemented in connection with the smart API libraries are generic such that the APIs can be used for any message-oriented middleware (MOM) infrastructure. Additionally, such APIs can also enable multiple enterprise partner ecosystem integrations, facilitating broad usage of a framework such as detailed herein to optimize the quality of enterprise message communications.

For example, such APIs can facilitate interaction between user devices (such as user devices 102 in FIG. 1) and the framework (e.g., message management system 105 in FIG. 1). In at least one embodiment, the APIs can be embodied as part of a management service layer within and/or in connection with message management system 105, and user devices 102 can interact with the management service layer via at least one self-service user interface. Also, in such an example embodiment, the APIs can include an authentication and authorization API, a user management API, a process management API, a rules management API, a metadata management API, a search API, etc. Additional examples and descriptions thereof can be found herein in connection with FIG. 4.

Figure 2:
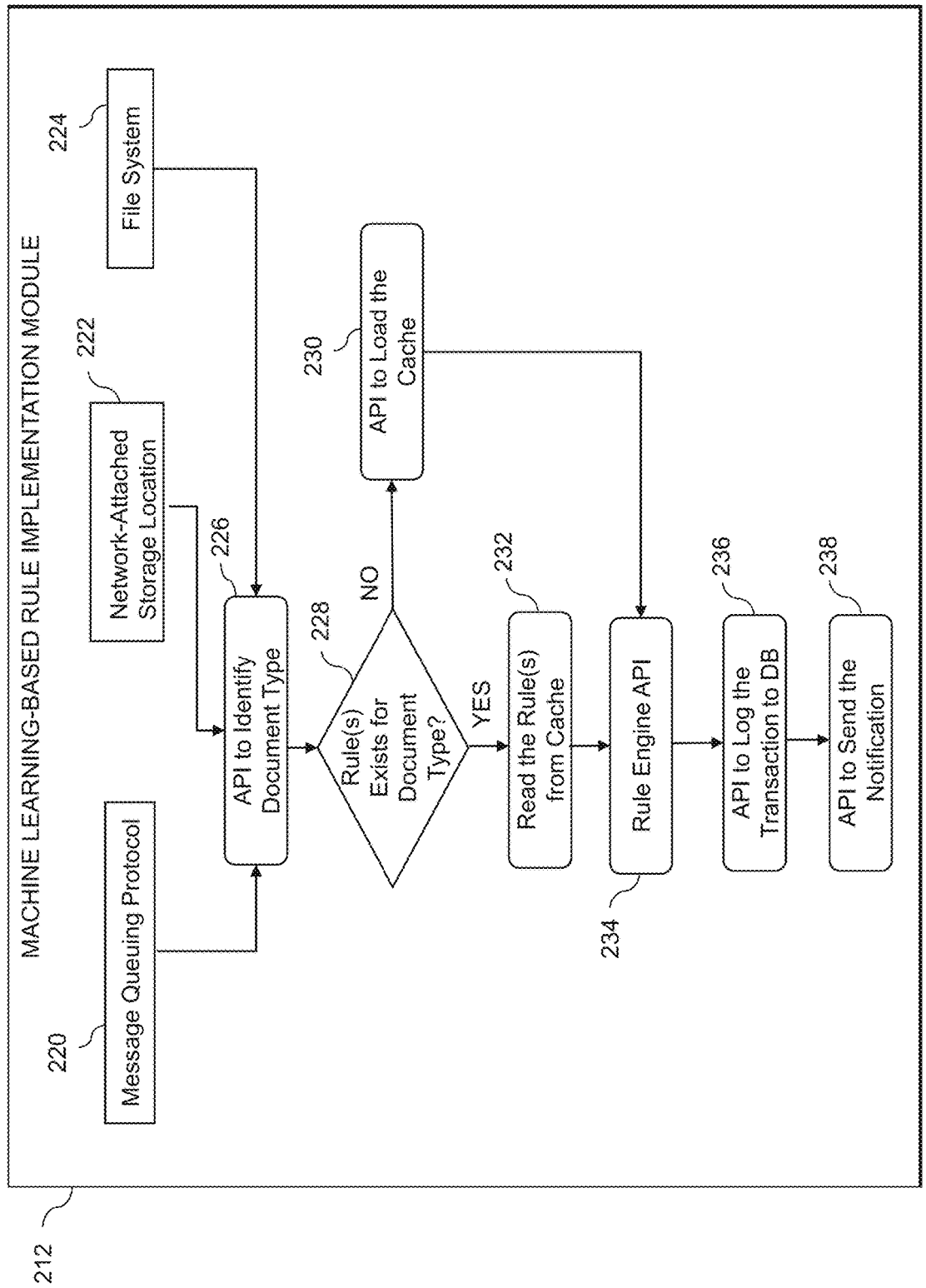
FIG. 2 shows an example workflow within a machine learning-based rule implementation module in an illustrative embodiment.

FIG. 2 shows an example workflow within a machine learning-based rule implementation module 212 in an illustrative embodiment. By way of illustration, FIG. 2 depicts a message queuing protocol 220, network-attached storage location information 222, and file system information 224 being provided to an API 226 to identify document type (of the document in question). Step 228 includes determining whether one or more rules exist for the document type identified via API 226. If yes (that is, one or more rules exist), then the rule(s) are read from a cache in step 232. If no (that is, one or more rules do not exist), then API 230 is engaged to load the cache, which includes connecting to at least one repository where the rules are stored, reading one or more of the rules, and loading at least a portion of the read rules to the cache.

Accordingly, API 234 includes a rule engine, which validates at least one file for global rules and/or custom rules, calls API 236 to log the transaction, and calls API 238 to send at least one notification.

Figure 3:
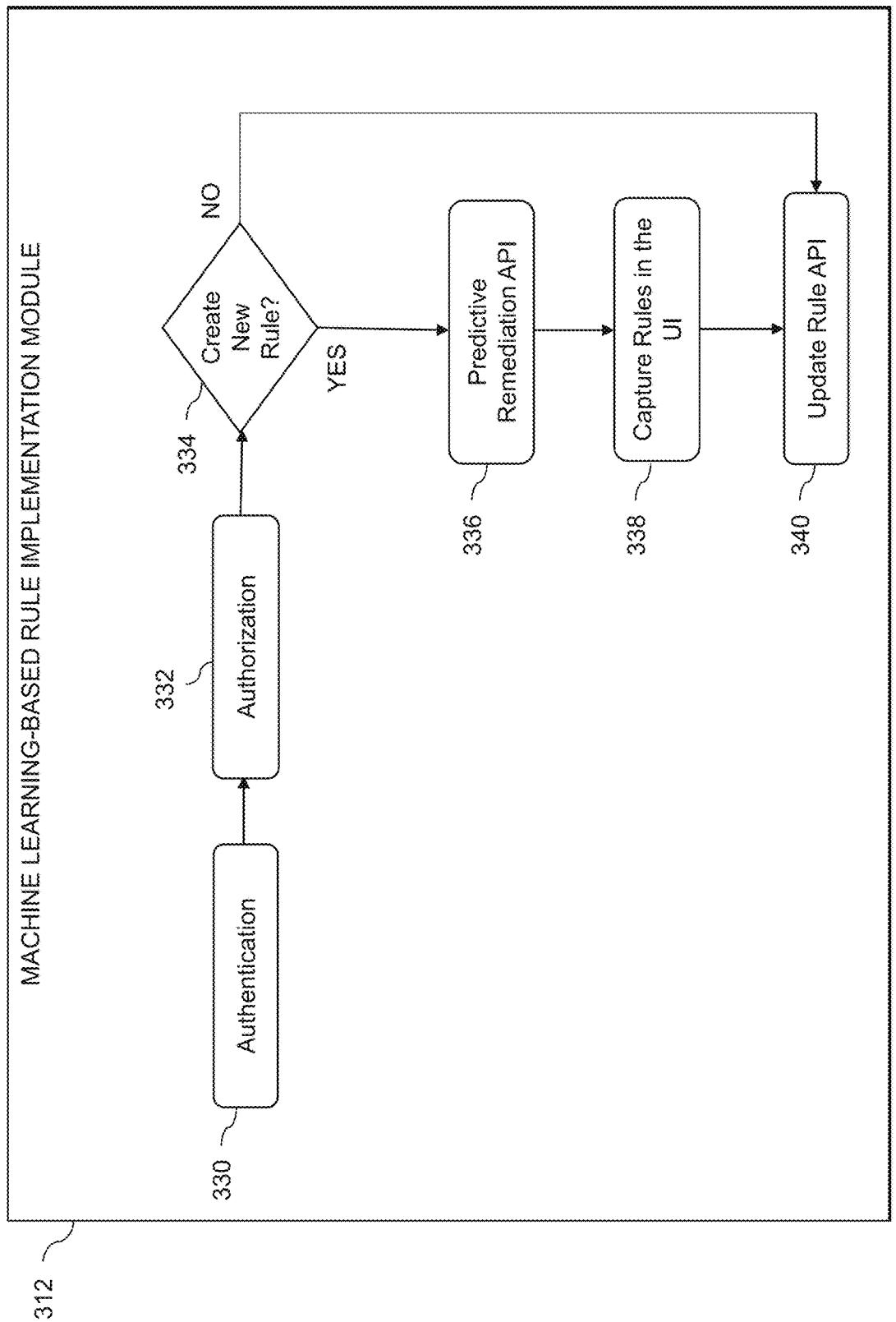
FIG. 3 shows an example workflow within a machine learning-based rule implementation module in an illustrative embodiment.

FIG. 3 shows an example workflow within a machine learning-based rule implementation module 312 in an illustrative embodiment. By way of illustration, FIG. 3 depicts an authentication module 330, which authenticates a user device, for example, via a single sign-on technique. Once authenticated, an authorization module 332 calls a roles API and returns a JavaScript object notation (JSON) web token (JWT) token which has the role(s) defined for the user device (and/or user thereof) contained therein.

Subsequent to authorization of the user device, step 334 includes determining whether a new rule is to be created. If no (that is, a new rule is not to be created), then API 340 is engaged to update at least one existing rule. If yes (that is, a new rule is to be created), then a predictive remediation API 336 is engaged, which suggests one or more rule(s) based at least in part on the flow and document type in question. Additionally, API 338 is engaged, which captures one or more rules in a user interface (UI). Such rules can include, for example, rules associated with the predictive remediation, user-added rules, etc. Further, API 340 then updates at least a portion of the captured rules.

Accordingly, as depicted in FIG. 3, once a user is authenticated and authorized, a JWT is provided to the user. In one or more embodiments, a JWT includes information such as the user role(s), as well as process and flow information. As used herein, a process encapsulates at least one flow of information from a source application to a target application, and a process can have one or more flows therein. As used herein, a flow is part of a single process and addresses a specific type of information (e.g., an order or purchase order, an invoice, etc.) transmitted from a source application to a target application defined for the process to which it belongs. A flow can also indicate the format (e.g., XML CSV, JSON, etc.) in which the data will move between applications and/or systems.

As also illustrated in FIG. 3, if a new rule is created (after authentication and authorization of the user), a predictive remediation API is called; otherwise (that is, if the rule is not new), a rule update API is called. Calling the predictive remediation API results in the presentation of a list of the rules that can be created for the given flow. Subsequently, a UI can be populated with existing rules, which can be modified as needed and/or desired.

Figure 4:
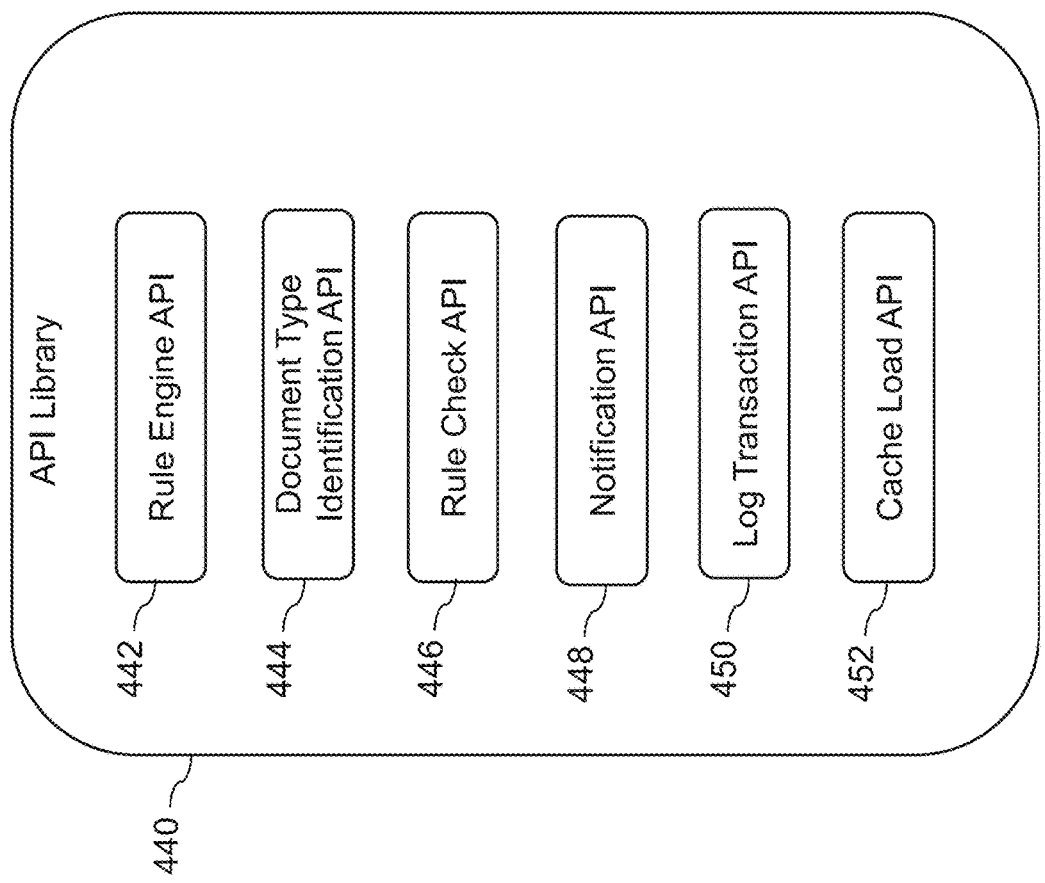
FIG. 4 shows an example smart application programming interface (API) library in an illustrative embodiment.

FIG. 4 shows an example smart API library 440 in an illustrative embodiment. By way of illustration, example API library 440 includes rule engine API 442, document type identification API 444, rule check API 446, notification API 448, log transaction API 450, and cache load API 452. In such an example embodiment, the rule engine API 442 reads a rule and applies the rule to at least one given file. The document type identification API 444 identifies and/or determines the document type of the document in question, and the rule check API 446 validates one or more rules set by the user. Also, the notification API 448 sends notifications to users regarding message failures, the log transaction API 450 logs transaction information to at least one database, and the cache load API 451 reads one or more rules from the at least one database and loads the read rule(s) into at least one cache.

As also detailed herein, at least one embodiment includes an administrator UI that includes capabilities pertaining to provisioning, metadata management, and notification setup. By way of example, provisioning capabilities can include approving and/or rejecting new users, and approving and/or rejecting new processes and/or flows. Metadata management capabilities can include, for example, managing processes, flows, document type information, and/or schema metadata. Further, notification setup capabilities can include setting-up one or more notification alerts for users.

As detailed herein, at least one embodiment includes using machine learning techniques to determine ideal and/or acceptable message-related information within a context to improve autonomous enterprise message management operations. In one or more embodiments, such machine learning techniques include one or more deep Q-network (DQN) algorithms, which leverage at least one neural network (NN) to estimate a Q-value, which is the value of taking a given action when in a given state. In such an embodiment, the NN includes a function that takes states as input and outputs a number or other value corresponding to how appropriate each action is. For example, using the channel status (CS) parameter, which can be part of a message management attributes input, the descriptive logic flow for the CS parameter is as follows:

CS can have one of the values below for a state and corresponding action:
S1=CS(not ready)→NN→Action1 which is given a value of 0 (for not ready), so Q-value=0;
S1=CS(retrying)→NN→Action1 which is given a value of 1 (for retrying), so Q-value=1;
S1=CS(ready)→NN→Action1 which is given a value of 2 (for ready), so Q-value=2.

Depending on the Q-value output, for example, a self-healing mechanism (as detailed herein) is initiated, if needed, as follows:
if Q-value<2, self-healing actions are triggered;
if Q-value>2, a reward is designated for this state/action, so message flow pass-through is normal.

In such an embodiment, various message attributes are provided as input to a machine learning model. Such attributes can include, for example, message type, message header, message format, message size, queue depth, channel status, cipher suite, target system, source system, service-level agreements (SLAs), expiry information, coded character set identifier (CCSID), general error code, specific component error code, quality of service, producer rate, consumer rate, etc.

Also, one or more embodiments can include using neural networks as approximators in conjunction with reinforcement learning techniques. In such embodiments, at least one neural network is implemented to learn to map states to values. Rather than using a lookup table to store, index, and update all possible states and their values, such an embodiment includes training a neural network using samples from a state or action space to learn to predict their value relative to one or more targets in reinforcement learning.

Figure 5:
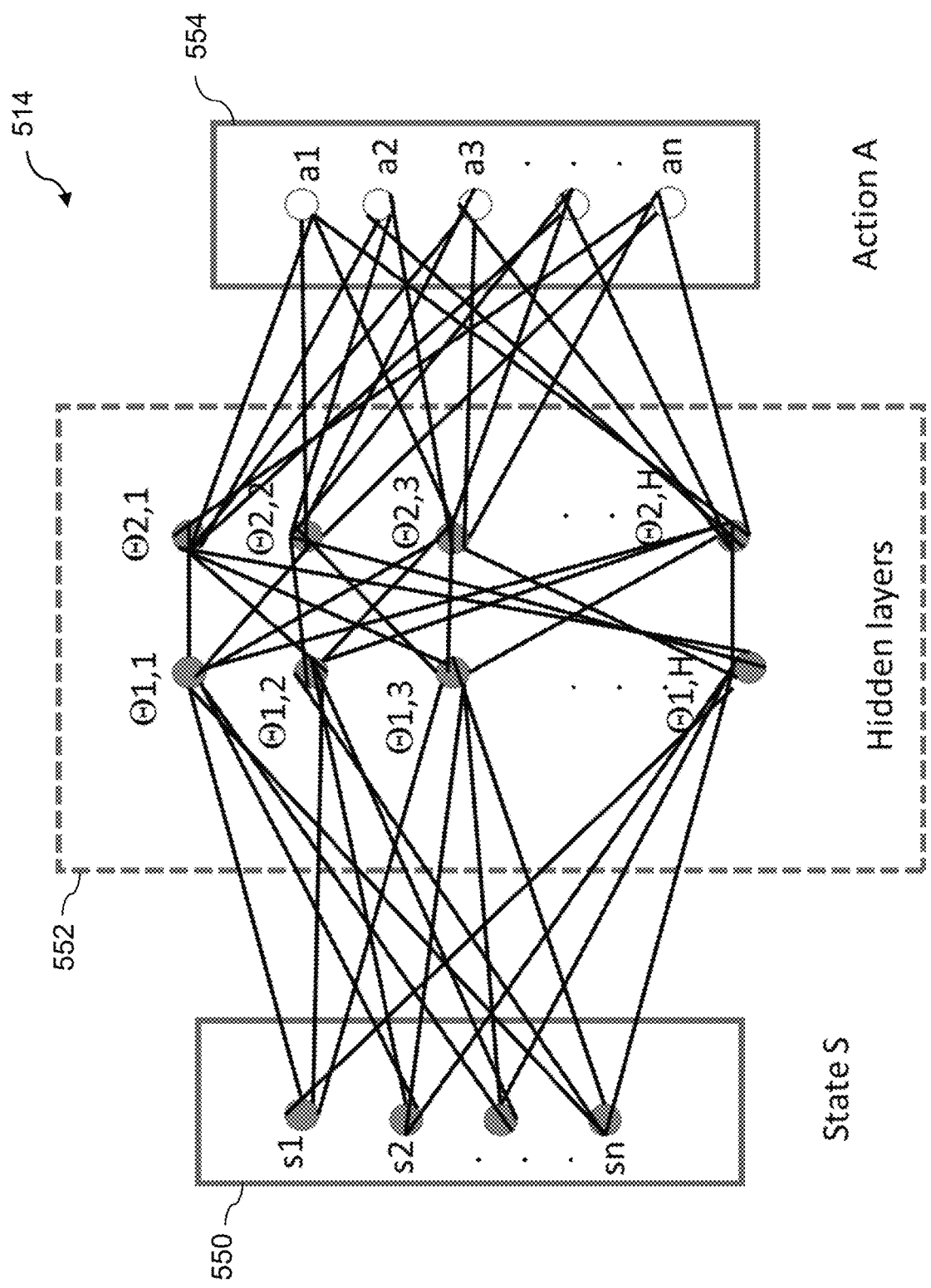
FIG. 5 shows an example neural network architecture utilized in an illustrative embodiment.

FIG. 5 shows an example neural network architecture utilized in an illustrative embodiment. By way of illustration, FIG. 5 depicts neural network 514, which includes states 550, hidden layers (HLs) 552, and actions 554. The HLs 552 of neural network 514 can be configured in one or more ways. In some cases, the HLs 552 are fine-tuned and calibrated. In other cases, weighted inputs are randomly assigned to the HLs 552. In either case, at least one artificial neuron in the HLs 552 takes in and processes probabilistic input signals, and converts such signals into an output corresponding to the axon of the at least one neuron.

Consider the CS example noted above, which includes one-to-one mapping. It should be appreciated, however, that the HLs in one or more embodiments can handle any type of mapping, including one-to-one, one-to-many, many-to-many, many-to-one, etc. Additionally, in at least one embodiment, such neural networks can be trained with any number of inputs and layers.

Also, a given training data set can be created as flows continue. An agent can attempt to select the most appropriate action using the NN, and subsequently, the state, action, reward and next state can be recorded. At least one embodiment can include determining a batch size n, and after every time n new records are recorded, n records are selected at random from the memory, and used to train the NN.

Accordingly, at least one embodiment includes implementing a neural network for self-healing based at least in part on a DQN used in fault management. In such an embodiment, reinforcement learning elements can be utilized, wherein an enterprise environment sets a new state along with a reward to a self-healing agent, which provides a configuration management (CM) action back to the enterprise environment. An example embodiment includes using a value-based approach, which determines the maximum value function over multiple policies, and subsequently selecting which action(s) to take (i.e., which policy to use) based on the values obtained from the model.

Additionally or alternatively, at least one embodiment includes implementing a smart remediation process, which includes an event-driven autonomous workflow. In such an embodiment, a system is configured to monitor enterprise messages and/or communications for certain events, and is triggered to perform one or more actions autonomously when a threshold is met. Such a smart remediation process can be integrated, for example, with an enterprise information system self-healing infrastructure (EISSHI), which includes a service with modular architecture. More specifically, an EISSHI is enabled infrastructure-as-code that can include loosely-coupled service components that communicate over a message bus and can be scaled horizontally. Also, an EISSHI can additionally include a web UI, a command-line interface (CLI) client, and a full representational state transfer (REST) API.

In an embodiment that includes implementation of an EISSHI, events are aggregated (e.g., pushed or pulled) from various services via sensors, at least a portion of those events are compared against one or more triggers, and actions are generated based at least in part thereon. Triggers typically include various actions that users perform in enterprise applications which would necessitate a certain set of corresponding actions that should be performed in other enterprise applications within or out of enterprise. For example, such triggers can include the following: when an order is successfully placed in the order application, the order information is sent to various other applications (e.g., manufacturing applications, fulfillment applications, etc.) to ensure successful delivery of the order; and when the order is ready to be dispatched, the dispatch application triggers a request to a third party courier partner to deliver the goods to the customer.

Also, in such an embodiment, processed actions from workflows are placed on a message queue, workflows are optionally processed by one or more services, and services are engaged to perform one or more workflow actions. Further, in such an embodiment, log history information and/or audit history information is pushed to a database for storage, and processed results are sent back to the rules engine for further processing.

Figure 6:
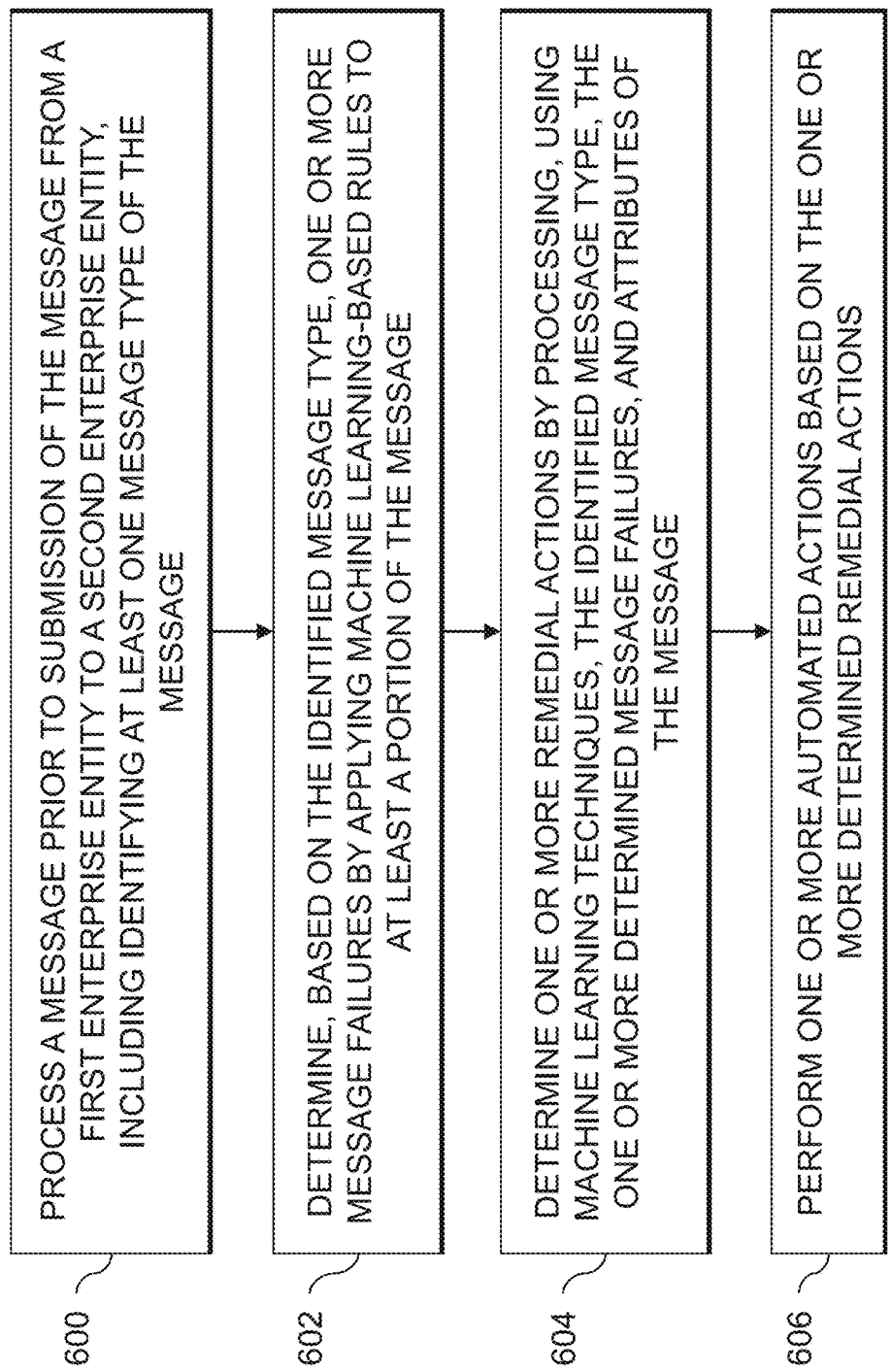
FIG. 6 is a flow diagram of a process for implementing a message management framework using machine learning techniques in an illustrative embodiment.

FIG. 6 is a flow diagram of a process for implementing a message management framework using machine learning techniques in an illustrative embodiment. It is to be understood that this particular process is only an example, and additional or alternative processes can be carried out in other embodiments.

In this embodiment, the process includes steps 600 through 606. These steps are assumed to be performed by the message management system 105 utilizing its modules 112, 114 and 116.

Step 600 includes processing a message prior to submission of the message from a first enterprise entity to a second enterprise entity, wherein processing the message comprises identifying at least one message type of the message. Step 602 includes determining, based at least in part on the at least one identified message type, one or more message failures by applying one or more machine learning-based rules to at least a portion of the message.

Step 604 includes determining one or more remedial actions by processing, using one or more machine learning techniques, the at least one identified message type, the one or more determined message failures, and multiple attributes of the message. In at least one embodiment, processing, using one or more machine learning techniques, the at least one identified message type, the one or more determined message failures, and multiple attributes of the message includes processing, using at least one neural network, the at least one identified message type, the one or more determined message failures, and multiple attributes of the message, and wherein processing using the at least one neural network comprises predicting values for one or more states associated with message management relative to one or more targets in at least one deep reinforcement learning model. In such an embodiment, processing using the at least one neural network includes inputting, to the at least one neural network, the multiple management comprising two or more of message type, message header, message format, message size, queue depth, channel status, cipher suite, target system, source system, service-level agreement information, expiry information, coded character set identifier, error code information, quality of service information, producer rate, and consumer rate.

The techniques depicted in FIG. 6 can also include, for example, training the one or more machine learning techniques using historical message data and historical remedial action data.

Step 606 includes performing one or more automated actions based at least in part on the one or more determined remedial actions. In at least one embodiment, performing one or more automated actions includes implementing one or more message-oriented middleware-agnostic application programming interfaces. Additionally or alternatively, in one or more embodiments, performing one or more automatic actions includes modifying the message by carrying out at least a portion of the one or more determined remedial actions.

In at least one embodiment, determining one or more message failures includes identifying one or more data formatting errors in the message. In such an embodiment, performing the one or more automated actions includes remedying the one or more identified data formatting errors in the message. Additionally or alternatively, in at least one embodiment, determining one or more message failures includes identifying one or more items of data missing from the message. In such an embodiment, performing the one or more automated actions comprises augmenting the message based at least in part on the one or more identified items of data missing from the message.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically identify message failures and determine corresponding remedial actions using machine learning techniques. These and other embodiments can effectively address problems associated with an inability to preempt invalid and/or inaccurate data in enterprise messages.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
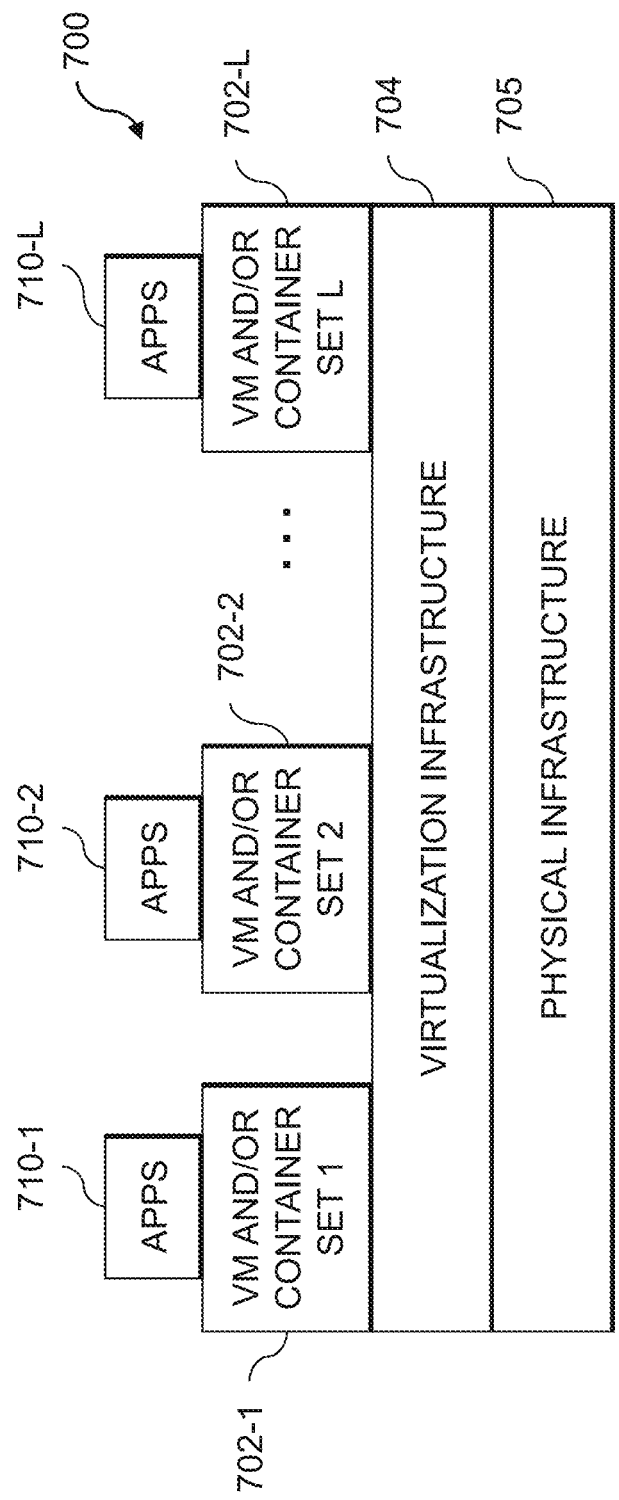
FIGS. 7 and 8 show examples of processing platforms that may be utilized to implement at least a portion of an information processing system in illustrative embodiments.
Figure 8:
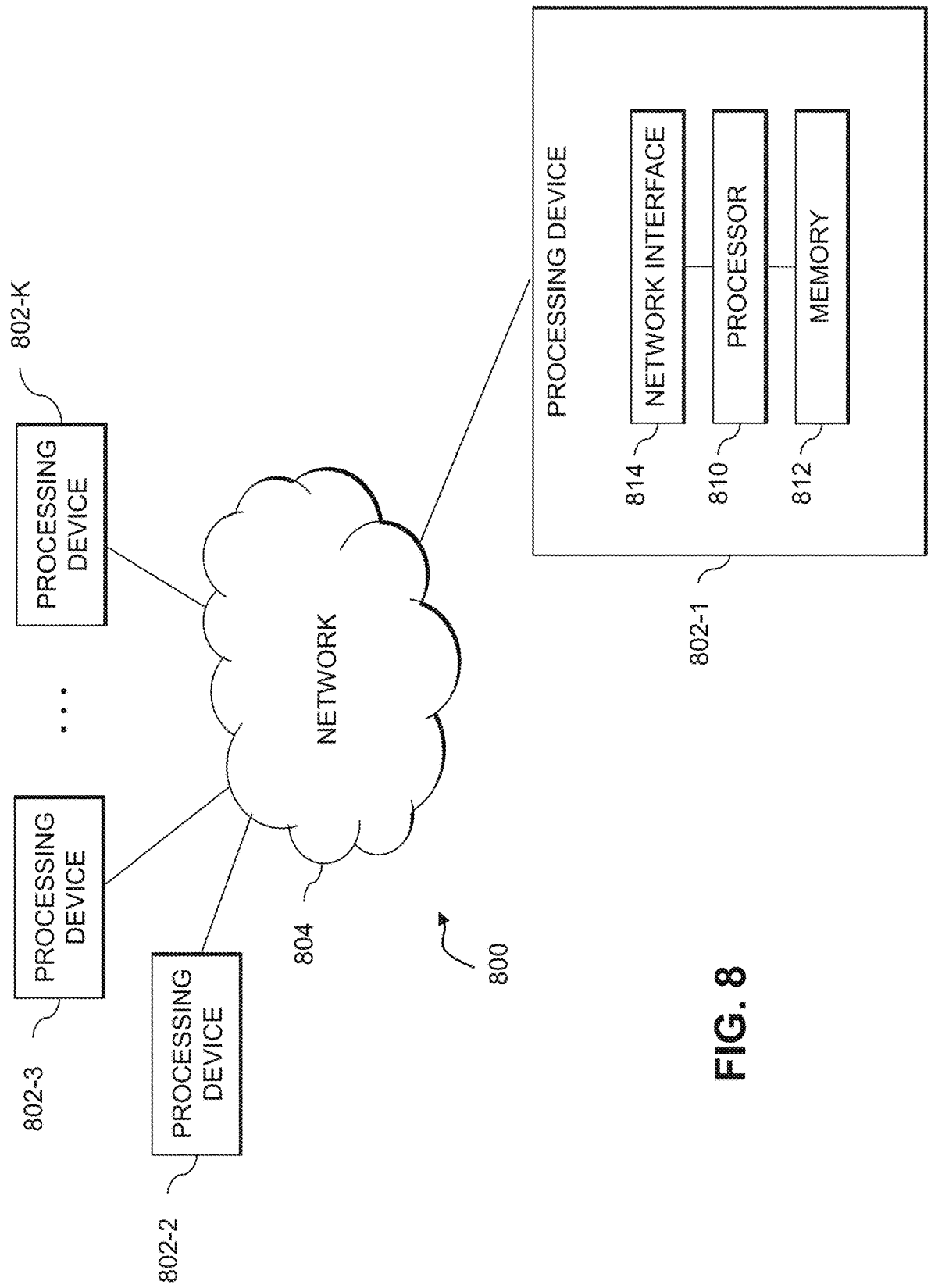

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs. Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
processing a message prior to submission of the message from a first enterprise entity to a second enterprise entity, wherein processing the message comprises identifying at least one message type of the message;
determining, based at least in part on the at least one identified message type, one or more message failures by applying one or more machine learning-based rules to at least a portion of the message;
determining one or more remedial actions by processing, using one or more machine learning techniques, the at least one identified message type, the one or more determined message failures, and multiple attributes of the message; and
performing one or more automated actions based at least in part on the one or more determined remedial actions;
wherein the method is performed by at least one processing device comprising a processor coupled to a memory.

2. The computer-implemented method of claim 1, wherein performing one or more automated actions comprises implementing one or more message-oriented middleware-agnostic application programming interfaces.

3. The computer-implemented method of claim 1, wherein processing, using one or more machine learning techniques, the at least one identified message type, the one or more determined message failures, and multiple attributes of the message comprises processing, using at least one neural network, the at least one identified message type, the one or more determined message failures, and multiple attributes of the message, and wherein processing using the at least one neural network comprises predicting values for one or more states associated with message management relative to one or more targets in at least one deep reinforcement learning model.

4. The computer-implemented method of claim 3, wherein processing using the at least one neural network comprises inputting, to the at least one neural network, the multiple management comprising two or more of message type, message header, message format, message size, queue depth, channel status, cipher suite, target system, source system, service-level agreement information, expiry information, coded character set identifier, error code information, quality of service information, producer rate, and consumer rate.

5. The computer-implemented method of claim 1, wherein performing one or more automatic actions comprises modifying the message by carrying out at least a portion of the one or more determined remedial actions.

6. The computer-implemented method of claim 1, further comprising:
training the one or more machine learning techniques using historical message data and historical remedial action data.

7. The computer-implemented method of claim 1, wherein determining one or more message failures comprises identifying one or more data formatting errors in the message.

8. The computer-implemented method of claim 7, wherein performing the one or more automated actions comprises remedying the one or more identified data formatting errors in the message.

9. The computer-implemented method of claim 1, wherein determining one or more message failures comprises identifying one or more items of data missing from the message.

10. The computer-implemented method of claim 9, wherein performing the one or more automated actions comprises augmenting the message based at least in part on the one or more identified items of data missing from the message.

11. A non-transitory processor-readable storage medium having stored therein program code of one or more software programs, wherein the program code when executed by at least one processing device causes the at least one processing device:
to process a message prior to submission of the message from a first enterprise entity to a second enterprise entity, wherein processing the message comprises identifying at least one message type of the message;
to determine, based at least in part on the at least one identified message type, one or more message failures by applying one or more machine learning-based rules to at least a portion of the message;
to determine one or more remedial actions by processing, using one or more machine learning techniques, the at least one identified message type, the one or more determined message failures, and multiple attributes of the message; and to perform one or more automated actions based at least in part on the one or more determined remedial actions.

12. The non-transitory processor-readable storage medium of claim 11, wherein performing one or more automated actions comprises implementing one or more message-oriented middleware-agnostic application programming interfaces.

13. The non-transitory processor-readable storage medium of claim 11, wherein processing, using one or more machine learning techniques, the at least one identified message type, the one or more determined message failures, and multiple attributes of the message comprises processing, using at least one neural network, the at least one identified message type, the one or more determined message failures, and multiple attributes of the message, and wherein processing using the at least one neural network comprises predicting values for one or more states associated with message management relative to one or more targets in at least one deep reinforcement learning model.

14. The non-transitory processor-readable storage medium of claim 11, wherein performing one or more automatic actions comprises modifying the message by carrying out at least a portion of the one or more determined remedial actions.

15. The non-transitory processor-readable storage medium of claim 11, wherein the program code when executed by the at least one processing device further causes the at least one processing device:
- to train the one or more machine learning techniques using historical message data and historical remedial action data.

16. An apparatus comprising:
- at least one processing device comprising a processor coupled to a memory;
- the at least one processing device being configured:
  - to process a message prior to submission of the message from a first enterprise entity to a second enterprise entity, wherein processing the message comprises identifying at least one message type of the message;
  - to determine, based at least in part on the at least one identified message type, one or more message failures by applying one or more machine learning-based rules to at least a portion of the message;
  - to determine one or more remedial actions by processing, using one or more machine learning techniques, the at least one identified message type, the one or more determined message failures, and multiple attributes of the message; and
  - to perform one or more automated actions based at least in part on the one or more determined remedial actions.

17. The apparatus of claim 16, wherein performing one or more automated actions comprises implementing one or more message-oriented middleware-agnostic application programming interfaces.

18. The apparatus of claim 16, wherein processing, using one or more machine learning techniques, the at least one identified message type, the one or more determined message failures, and multiple attributes of the message comprises processing, using at least one neural network, the at least one identified message type, the one or more determined message failures, and multiple attributes of the message, and wherein processing using the at least one neural network comprises predicting values for one or more states associated with message management relative to one or more targets in at least one deep reinforcement learning model.

19. The apparatus of claim 16, wherein performing one or more automatic actions comprises modifying the message by carrying out at least a portion of the one or more determined remedial actions.

20. The apparatus of claim 16, wherein the at least one processing device being further configured:
- to train the one or more machine learning techniques using historical message data and historical remedial action data.

* * * * *